(12) United States Patent
Castleberry

(10) Patent No.: US 7,921,597 B2
(45) Date of Patent: Apr. 12, 2011

(54) FLOWER STEM BAG WRAP WITH OUTER PLASTIC COVERING

(76) Inventor: Wayne Castleberry, Richmond, VA (US)

( * ) Notice: Subject to any disclaimer, the term of this patent is extended or adjusted under 35 U.S.C. 154(b) by 278 days.

(21) Appl. No.: 11/501,865

(22) Filed: Aug. 10, 2006

(65) Prior Publication Data

US 2006/0265950 A1    Nov. 30, 2006

Related U.S. Application Data

(63) Continuation-in-part of application No. 11/258,920, filed on Oct. 27, 2005, which is a continuation-in-part of application No. 10/670,531, filed on Sep. 26, 2003.

(51) Int. Cl.
*A47G 7/02* (2006.01)
(52) U.S. Cl. .......................................... 47/41.01; 47/72
(58) Field of Classification Search ............. 47/65, 65.5, 47/65.7, 65.8, 66.6, 84, 41.01, 41.15, 72, 47/73, 74, 76, 78; 206/423, 523
See application file for complete search history.

(56) References Cited

U.S. PATENT DOCUMENTS

| | | | | | |
|---|---|---|---|---|---|
| 2,774,187 | A | * | 12/1956 | Smithers | 47/41.12 |
| 3,889,417 | A | * | 6/1975 | Wood et al. | 47/58.1 R |
| 4,469,502 | A | * | 9/1984 | Heller et al. | 71/11 |
| 4,646,470 | A | * | 3/1987 | Maggio | 47/76 |
| 5,018,300 | A | * | 5/1991 | Chiu et al. | 47/67 |
| 5,477,637 | A | * | 12/1995 | Aldrich | 47/41.01 |
| 5,634,558 | A | * | 6/1997 | Weder | 206/423 |
| 5,657,868 | A | * | 8/1997 | Taylor | 206/423 |
| 6,604,632 | B2 | * | 8/2003 | Weder | 206/423 |
| 2005/0150159 | A1 | * | 7/2005 | Weder et al. | 47/41.01 |

FOREIGN PATENT DOCUMENTS

| | | | |
|---|---|---|---|
| EP | 1749761 A1 | * | 7/2007 |
| JP | 10-290629 | * | 4/1998 |
| WO | WO 93/15979 | * | 8/1993 |

* cited by examiner

*Primary Examiner* — T. Nguyen
(74) *Attorney, Agent, or Firm* — John S. Hale; Gipple & Hale

(57) ABSTRACT

A horticultural cut flower container assembly comprising a plastic bag with a folded cross shaped base member of flexible foam material secured to the bag, the cross shaped foam material being adapted to receive the stem ends of a bunch of cut flowers and a drawstring mounted to the bag encircling the bag and stem ends of a bunch of cut flowers to hold the stem ends in said bag in a secured position.

4 Claims, 2 Drawing Sheets

FLOWER STEM BAG WRAP WITH OUTER PLASTIC COVERING

CROSS-REFERENCE TO RELATED APPLICATIONS

The application is a continuation-in-part of U.S. patent application Ser. No. 11/258,920 filed on Oct. 27, 2005, which is a continuation-in-part of U.S. patent application Ser. No. 10/670,531 filed on Sep. 26, 2003.

TECHNICAL FIELD OF THE INVENTION

The present invention relates generally to a bag wrap for transporting cut flowers and plants. More particularly, this invention relates to a base member formed of polyisocyanate foam material using diphenylmethane diisocyanates which is folded and placed in a bag to hold flower stems and is secured with a draw string wrapped around the bag.

BACKGROUND OF THE INVENTION

I. Field of the Invention

The present invention relates generally to floriculture. In particular, the present invention relates to a device and method for holding the stems of plants such as cut flowers during shipment and hydrating the flowers.

II. Discussion of Background

The flower industry is a multi-billion dollar industry worldwide. In the U.S. alone, sales of cut roses exceed hundreds of million dollars per year. The most popular varieties of rose often retail for several dollars per rose. Sales of other cut flowers and plants such as bamboo are also substantial.

It is a common practice to sustain the life of cut flowers by means of inserting the end of the plant stem in a reservoir containing a liquid such as water. Flowers start to wilt just a few hours after cutting unless they are supplied with water and nutrients. The first indication of wilting is when the stem starts to bend just below the flower head. As the stem bends, the flower head droops and the flow of water up the stem is impeded. Soon afterwards, the flower petals start to discolor and the flower dies. In shipment from the grower, cut flowers are generally wrapped in newspaper or shredded paper or fiber and covered with a paper or plastic sleeve. In shipping, the cut flowers are often stored under uncontrolled temperatures which can cause dehydration and destruction of lots or individual flowers.

Many techniques are available for extending the useful life of cut flowers, including changing their water regularly, adding preservatives to the water, trimming the stems, keeping the flowers away from direct sunlight, and refrigerating them. Even when such precautions are taken, cut flowers start to wilt after a few days.

A number of devices have been used for supporting and shipping cut flowers. For example, a spacing disc for a conical paper flower container having a plurality of spaced tear-shaped openings for holding flower stems is shown by U.S. Pat. No. 3,767,104 issued Oct. 23, 1973. Flowers can be fixed to a continuous strip, which is then rolled in such a fashion that the flowers are isolated from one another to facilitate storage and transport as is shown by U.S. Pat. No. 3,657,840 issued Apr. 25, 1972. Holders for cut flowers include a flexible paper cover for protecting the flower petals as shown by U.S. Pat. No. 3,271,922 issued Sep. 13, 1966 and a cardboard sleeve for receiving the stems as shown by U.S. Pat. No. 2,247,191 issued Jun. 24, 1941. A waterproof wrapper for corsage stems is shown by U.S. Pat. No. 1,044,260 issued Nov. 12, 1912.

There is a need for a simple, easy-to-use container for cut flowers which keep the flowers hydrated during wholesale shipment and/or delivery from the florist to the end user. The container should not damage the stems of the flower when wrapped and should hold the stems firmly, allowing air water and nutrients to contact each stem and be simple and inexpensive to manufacture.

SUMMARY OF THE INVENTION

A cross shaped foam material base member is folded over the cut ends of the stems of cut flowers and covered with a bag to form a wrap covering the flower stems. The wrap is held in place with a draw string which is tied around the outer bag over the ends of the stems. The inner base portion of the wrap is constructed of a sterile diphenylmethane diisocyanate (MDI) foam material having at least 50% of its pores ranging in size from 10 to 200 microns. If desired the foam material can be of an organic polyisocyanate foam material using one or more of crude, polymeric, 4,4'-, 2,4'- and 2,2'-diphenylmethane diisocyanates with a soy based polyol ranging from 10% to 25% having a low density.

The present invention provides a novel cut plant container for providing liquid to a cut plant wherein a substantial amount of the liquid required by the plant is presented to the cut end of the plant stem for preserving the life of a cut plant.

It is an object of the invention to provide a horticultural container for cut flowers having a homogeneous horticultural foam material base which is sterile.

It is another object of the invention to provide a horticultural container for cut flowers which hydrates flowers in shipment.

It is yet another object of the invention to provide a horticultural container for cut flowers which directs water held in the foam to the stems.

It is still another object of the invention to provide a horticultural container for cut flowers which can be economically fabricated to fit a wide variety of stem bunch sizes.

It is another object of the invention to provide a horticultural container for cut flowers which can be easily applied by the shipper or florist to bunches of cut flowers.

These and other objects, advantages, and novel features of the present invention will become apparent when considered with the teachings contained in the detailed disclosure along with the accompanying drawings.

DETAILED DESCRIPTION OF THE INVENTION

Figure 1:
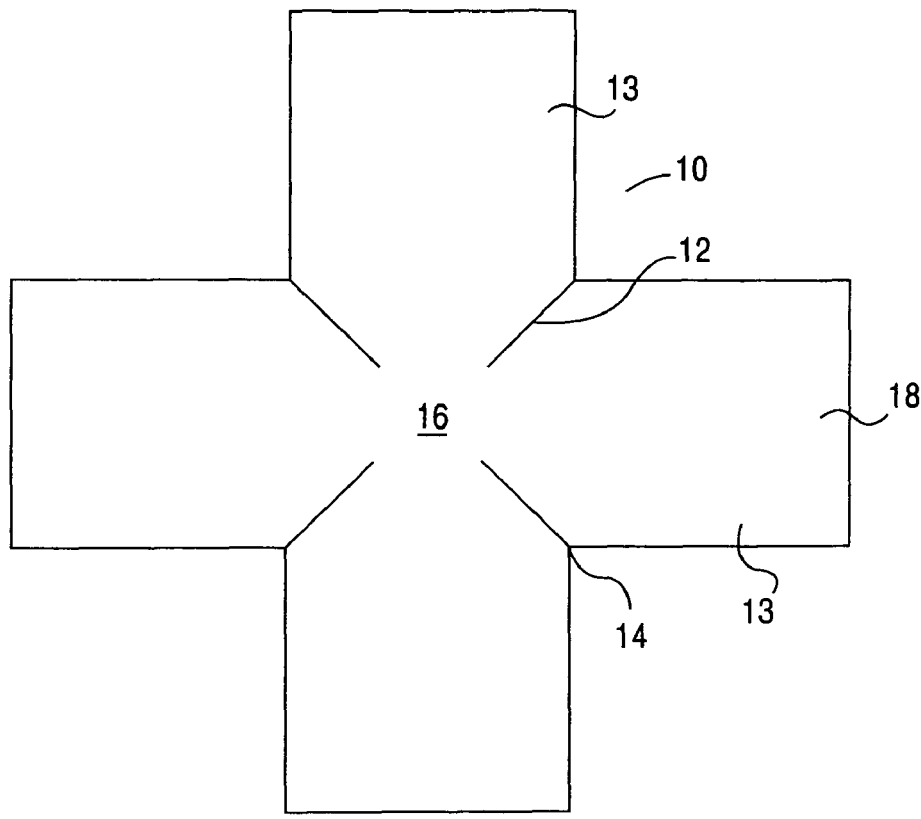
FIG. 1 is a plan view of plant wrap base of the present invention.
Figure 2:
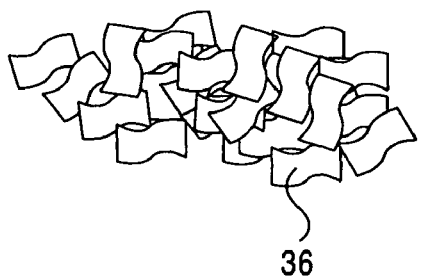
FIG. 2 is a perspective view of shavings of polyurethane foam which can be added to the wrap base of FIG. 1.
Figure 3:
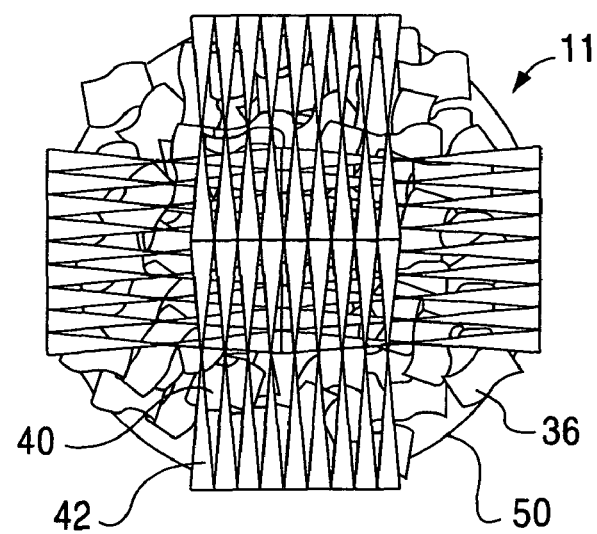
FIG. 3 is a bottom plan view of the wrap invention of FIG. 1 formed with a plurality of cut outs.

The preferred embodiment and best mode of the invention is shown in FIGS. 1 through 3.

The invention is directed toward a preferred cross shaped foam member 10 formed of an aromatic polyisocyanate polymer diphenylmethane diisocyanate (MDI) flexible foam material using no filler material which hydrates cut flowers in shipment by directing water absorbed in the foam wrap to the stems.

The polyisocyanate used in the foam material is an aromatic polyisocyanate which includes aromatic diisocyanates having 6 to 16 carbon atoms (excluding those contained in NCO groups; this applies to the polyisocyanates mentioned below), aromatic triisocyanates having 6 to 20 carbon atoms and crude products of these isocyanates, etc. Examples of aromatic polyisocyanate include 1,3- and 1,4-phenylene diisocyanates, 2,4- and/or 2,6-tolylene diisocyanates (TDI), crude TDI and 2,4'- and/or 4,4'-diphenylmethane diisocyanate (MDI) as well as crude MDI.

The preferred material which is used as the foam material in the invention is one or more of 2,2'-, 2,4'- and 4,4'-diphenylmethane diisocyanate (MDI), crude MDI, products of crude diaminodiphenyl methane where the crude diaminodiphenyl methane is a polymeric MDI or a mixture of the same; or is a mixture of diaminodiphenyl methane and a small amount (e.g., 5 to 20 mass %) of a polyamine having three or more functional groups; polyallyl polyisocyanate (PAPI), etc. If a fully biodegradable material is desired, an organic polyisocyanate foam material using one or more of crude, polymeric, 4, 4'-, 2,4'- and 2,2'-diphenylmethane diisocyanates with a soy based polyol ranging from 10% to 25% having a low density is used.

The base material is readily obtained in the market place and examples of same for purposes of showing commercial availability but which should not be construed as limiting are: BASF M-20S, and Rubinate 1680, Rubinate 1790, Rubinate 7302, Rubinate 7400, Rubinate 8700, Rubinate 9410 and Suprasec DNR all of which are available from ICI Americas.

The material is foamed in a conventional manner with a blowing agent such as carboxylic acids and anhydrides. It is important that no filler material is added to the foamed material and the material is substantially sterile with a neutral pH ranging from 6.8 to 7.8. The term substantially sterile is used in a horticultural sense and not as a medical term meaning the material is free from plant disease, microbes, fungus, insects, disease, algae and animal life.

The material has a pore size with total porosity ranging from 85% to 95%, preferably from 90% to 92% with an air space ranging from 25 to 35%, preferably about 30%. Air space is the percent volume of a component which is filled with air after the material is saturated and allowed to drain. For a given density and moisture content, Total Porosity+Container Capacity+Air Space. The foam member and associated foam shavings has a density of 1.00 to 3.00 preferably about 1.35 pounds per cubic foot and tensile strength ranging from 7.5 to 9.5, preferably at 8.0 psi per minute. The tear strength ranges from 0.18 to 0.22, preferably 0.2. Total porosity is the percent by volume of the foam that is comprised of pores. This is the volume fraction which provides the water and aeration in the foam material. The total porosity+the percent solids=100%. At least 40% to 60%, preferably about 50% of the foam material volume of the material contains pores ranging in size between 10 and 200 microns, preferably from about 40 to about 90 microns. These pores sizes are defined as mesopores which are responsible for water retention.

The micropore fraction (0.2 to 10 microns) of the foam material may range from 15% to 25% by foam volume, and preferably is held constant at about 20%. Micropores are responsible for water reserve and consist of open and closed pores per cubic inch of foam.

The macropore fraction of the foam material ranges from 25% to 35%, preferably about 30% of the foam volume and contains pores ranging in size between 300-800 microns. These macropores are responsible for drainage and aeration.

The cross shaped foam base member 10 as shown in FIG. 1 is preferably 12 inches by 12 inches in size with each arm of the cross being 4 inches by 4 inches. At the intersection of each arm 13 is a corner slit 12 cut inward from the corner 14 at a 45° angle from the horizontal and vertical axis of the cross member 10 and extending inward to a central section 16 to form side panels 18. The thickness of the foam material of the base member ranges from ¼ inch to 1½ inch with the preferred thickness being ¼ inch. The side panels 18 are folded upward and are held together with an elastic band which is wrapped around the side panels 18 or may be glued together with a water based glue to form a cup shaped structure which is placed at the bottom of the bag 30 to receive the ends of the plant stems. The cup structure which is the folded base member is glued to the bottom of the bag 30 to hold the cup structure securely in place inside the bag or is mounted inside the bag 30. The bag 30 is constructed of plastic preferably of polyethylene. The cup structure may be additionally filled with shavings 36 of polyurethane foam as seen in FIG. 2. If desired the cross shaped member 10 may be formed with angular elongated diamond shaped slits or cutouts 40 as seen in FIG. 3. The cutouts form rows of angular shaped segments 42 which have end portions separated by the similarly shaped cutouts. A pouch 50 enclosing shavings 36 or polyurethane foam is mounted or secured to the foam material base member 31 which is then wetted for hydrating flowers.

Figure 6:
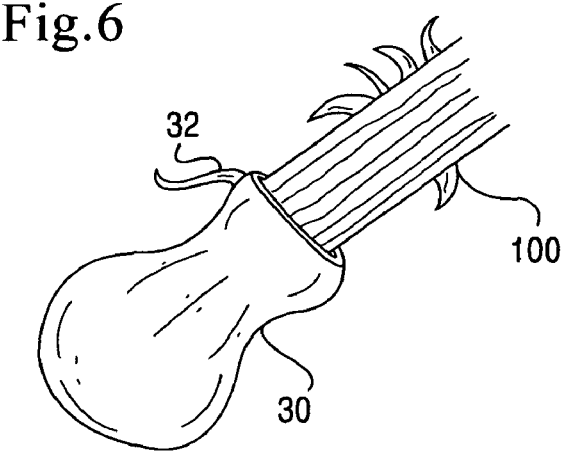
FIG. 6 is a perspective view of the bag wrap with the folded foam base placed inside the bag holding cut flower stems.

The bag 30 is inverted and the folded cup structure of the base member 10 or 11 is glued to the bottom of the bag and is then soaked with water and such preservatives and nutrients as required. The flower stems 100 of a bunch of flowers or other plants are placed with the cut ends in the middle section 16 of the foam structure member 10 or 11. The bag 30 is pulled back over the cup structure to form a wrap for the flower stems. The bag 30 is folded back over the flower or plant stems 100 and a fastening strap in the form of a draw string 32 is tightened around the bag and flower stems holding the bag wrapped around the stems as is shown in FIG. 6.

Figure 4:
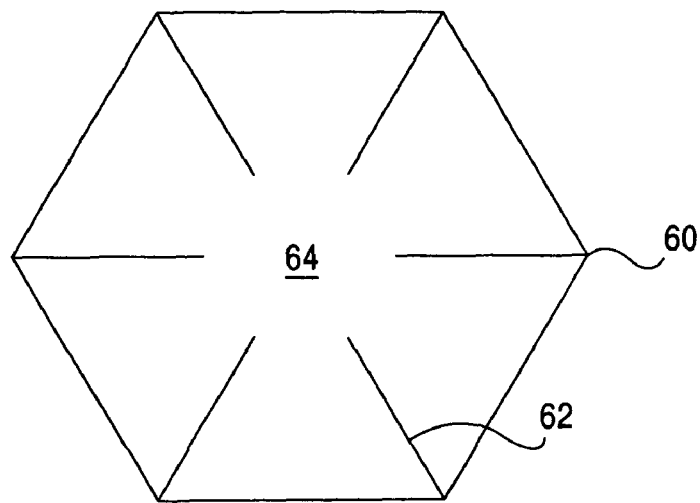
FIG. 4 is a plan view of a hexagonal shaped wrap base.
Figure 5:
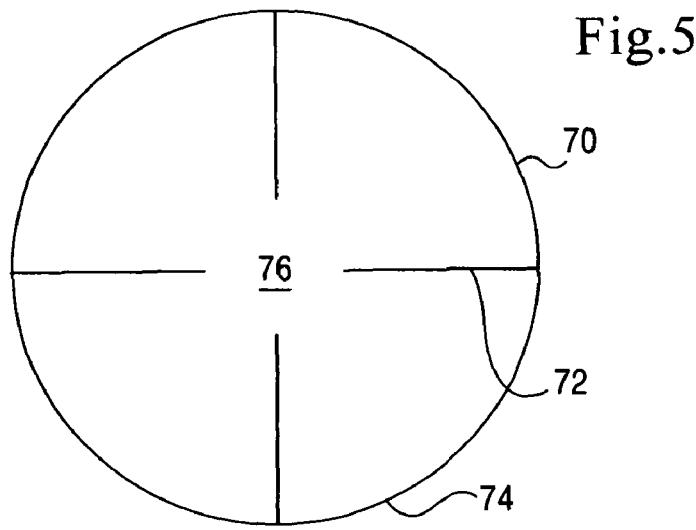
FIG. 5 is a plan view of another shape embodiment in the form of a circle.

FIG. 4 shows a alternative hexagonal shaped base member 60 with slits 62 running from each corner toward center section 64. FIG. 5 shows a circular shaped base member 70 with slits 72 equally spaced from each other running from the circumference 74 of the circle toward the center area 76. Both the hexagonal shaped base member 60 and the circular shaped base member 70 are folded to present a cup shape to receive the cut ends of plants or flowers and are secured or mounted to the bag 30 as previously set forth The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. A horticultural cut flower container assembly comprising:

a plastic resilient waterproof bag with a cross shaped base member constructed of flexible unfilled sterile diphenylmethane diisocyanate foam material secured to said bag, said cross shaped base member defining a plurality of cutouts, the cross shaped diphenylmethane diisocyanate foam material being adapted to be folded into a cup shape to receive the stem ends of a bunch of cut flowers, a fastener mounted to said bag to hold said stem ends in said bag in a secured position, and a pouch filled with a plurality of foam pieces being secured to said base member.

2. A horticultural cut flower container assembly comprising:

a plastic resilient waterproof bag with a cross shaped base member constructed of flexible unfilled sterile diphenylmethane diisocyanate foam material secured to said bag, said cross shaped base member defining a plurality of cutouts, the cross shaped diphenylmethane diisocyanate foam material being adapted to be folded into a cup shape to receive the stem ends of a bunch of cut flowers, a fastener mounted to said bag to hold said stem ends in said bag in a secured position, and a pouch filled with a plurality of foam pieces being secured to said base member, said foam pieces being shaved foam.

3. A horticultural cut flower container assembly comprising:

a cross shaped member of flexible unfilled diphenylmethane diisocyanate foldable foam material taken from a group consisting of polymeric diphenylmethane diisocyanate, crude diphenylmethane diisocyanate, 4,4'-, 2,4'-, 2,2'-diphenylmethane diisocyanate having a thickness ranging from about ¼ inch to about 1½ inch with a plurality of angular cutouts formed in its body defining at least one central fold line in its central area, said cross shaped member being folded and mounted in a plastic resilient waterproof bag to hold the stem ends of a bunch of cut plants in said bag and closure means mounted on one end of said bag to close the end of said bag around said plant stems to hold said stems in a wrapped configuration, said folded cross shaped member mounted in said plastic resilient waterproof bag being filled with a plurality of foam pieces secured to said cross shaped member.

4. A horticultural cut flower container assembly as claimed in claim 3 wherein said flexible unfilled diphenylmethane diisocyanate foldable foam material exhibits a cation exchange capacity ranging from about 1.0 to 1.5, a pH ranging about 6.8, and optimum pore size ranging from about 40 μm to 90 μm.

* * * * *